United States Patent
Lodwick et al.

(10) Patent No.: US 7,281,247 B2
(45) Date of Patent: Oct. 9, 2007

(54) SOFTWARE IMAGE CREATION IN A DISTRIBUTED BUILD ENVIRONMENT

(75) Inventors: Stephen Lodwick, Covington, WA (US); Jason Cohen, Seatac, WA (US); Ryan Burkhardt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 617 days.

(21) Appl. No.: 10/603,294

(22) Filed: Jun. 24, 2003

(65) Prior Publication Data

US 2004/0268345 A1    Dec. 30, 2004

(51) Int. Cl.
*G06F 9/45* (2006.01)
(52) U.S. Cl. ...................................................... 717/176
(58) Field of Classification Search ................ 717/176; 709/202
See application file for complete search history.

(56) References Cited

U.S. PATENT DOCUMENTS

| | | | |
|---|---|---|---|
| 5,142,680 A | 8/1992 | Ottman et al. | |
| 5,469,573 A | 11/1995 | McGill, III et al. | |
| 5,471,615 A * | 11/1995 | Amatsu et al. | 709/202 |
| 5,555,416 A | 9/1996 | Owens et al. | |
| 5,713,024 A | 1/1998 | Halladay | |
| 5,794,052 A | 8/1998 | Harding | |
| 6,016,400 A | 1/2000 | Day et al. | |
| 6,080,207 A | 6/2000 | Kroening et al. | |
| 6,110,228 A | 8/2000 | Albright et al. | |
| 6,112,225 A | 8/2000 | Kraft et al. | |
| 6,138,179 A | 10/2000 | Chrabaszcz et al. | |
| 6,188,779 B1 | 2/2001 | Baum | |
| 6,230,318 B1 | 5/2001 | Halstead et al. | |
| 6,247,128 B1 | 6/2001 | Fisher et al. | |
| 6,262,726 B1 | 7/2001 | Stedman et al. | |
| 6,282,711 B1 | 8/2001 | Halpern et al. | |
| 6,286,138 B1 | 9/2001 | Purcell | |
| 6,377,958 B1 | 4/2002 | Orcutt | |
| 6,385,766 B1 | 5/2002 | Doran, Jr. et al. | |
| 6,453,413 B1 | 9/2002 | Chen et al. | |
| 6,512,526 B1 | 1/2003 | McGlothlin et al. | |
| 6,532,474 B2 | 3/2003 | Iwamoto et al. | |
| 6,598,223 B1 | 7/2003 | Vrhel, Jr. et al. | |
| 6,681,323 B1 | 1/2004 | Fontanesi et al. | |
| 6,711,624 B1 | 3/2004 | Narurkar et al. | |
| 6,772,192 B1 * | 8/2004 | Fulton et al. | 709/203 |

(Continued)

FOREIGN PATENT DOCUMENTS

EP        0859314 A2    8/1998

OTHER PUBLICATIONS

Zhang et al., "A Modeling Perspective of Image-Based Installation," Dell White Paper, pp. 1-13, Mar. 2002, U.S.A.

(Continued)

*Primary Examiner*—John Chavis
(74) *Attorney, Agent, or Firm*—Senniger Powers

(57) ABSTRACT

Distributing software image creation and configuration among a plurality of client computers. Server computers define jobs related to software image creation. Each of the client computers communicates with the servers to identify, accept, and complete jobs. The server and client computers maintain data structures indicating job availability and status. In the distributed build environment, original equipment manufacturers (OEMs) and system builders may easily modify, create, and image software in the factory to dramatically reduce resource consumption and time.

21 Claims, 5 Drawing Sheets

U.S. PATENT DOCUMENTS

| | | |
|---|---|---|
| 2002/0156877 A1 | 10/2002 | Lu et al. |
| 2002/0174329 A1 | 11/2002 | Bowler et al. |
| 2002/0188941 A1 | 12/2002 | Cicciarelli et al. |
| 2002/0194398 A1 | 12/2002 | Bentley et al. |
| 2003/0018759 A1 | 1/2003 | Baumann |
| 2003/0233379 A1 | 12/2003 | Cohen et al. |
| 2004/0070678 A1 | 4/2004 | Toyama et al. |
| 2004/0218902 A1 | 11/2004 | Yanagita |

OTHER PUBLICATIONS

White Paper, "Microsoft Windows 2000 Server—Remote Operating System Installation," Microsoft Corporation, pp. i-iv, 1-41, 1999, U.S.A.

Sullivan, et al., "Astronomical and Biochemical Origins and the Search for Life in the Universe," Proceedings of the Fifth International Conference on Bioastronomy, IAU Colloq. No. 161, 1997, 5 pages, Editrice Compositori, Bologna, Italy.

Korel, et al., "Version Management in Distributed Network Environment," Proceedings of the 3rd International Workshop on Software Configuration Management, 1991, pp. 161-166. ACM Press, New York, U.S.A.

Tanenbaum et al., "Experience with the Amoeba Distributed Operating System," Communications of the ACM, Dec. 1990, pp. 46-63, vol. 33, Issue 12, ACM Press, New York, U.S.A.

Liu et al., "Building Reliable, High-Performance Communication Systems From Components," Proceedings of the Seventeenth ACM Symposium on Operating Systems Principles, 1999, pp. 80-92, ACM Press, New York, U.S.A.

\* cited by examiner

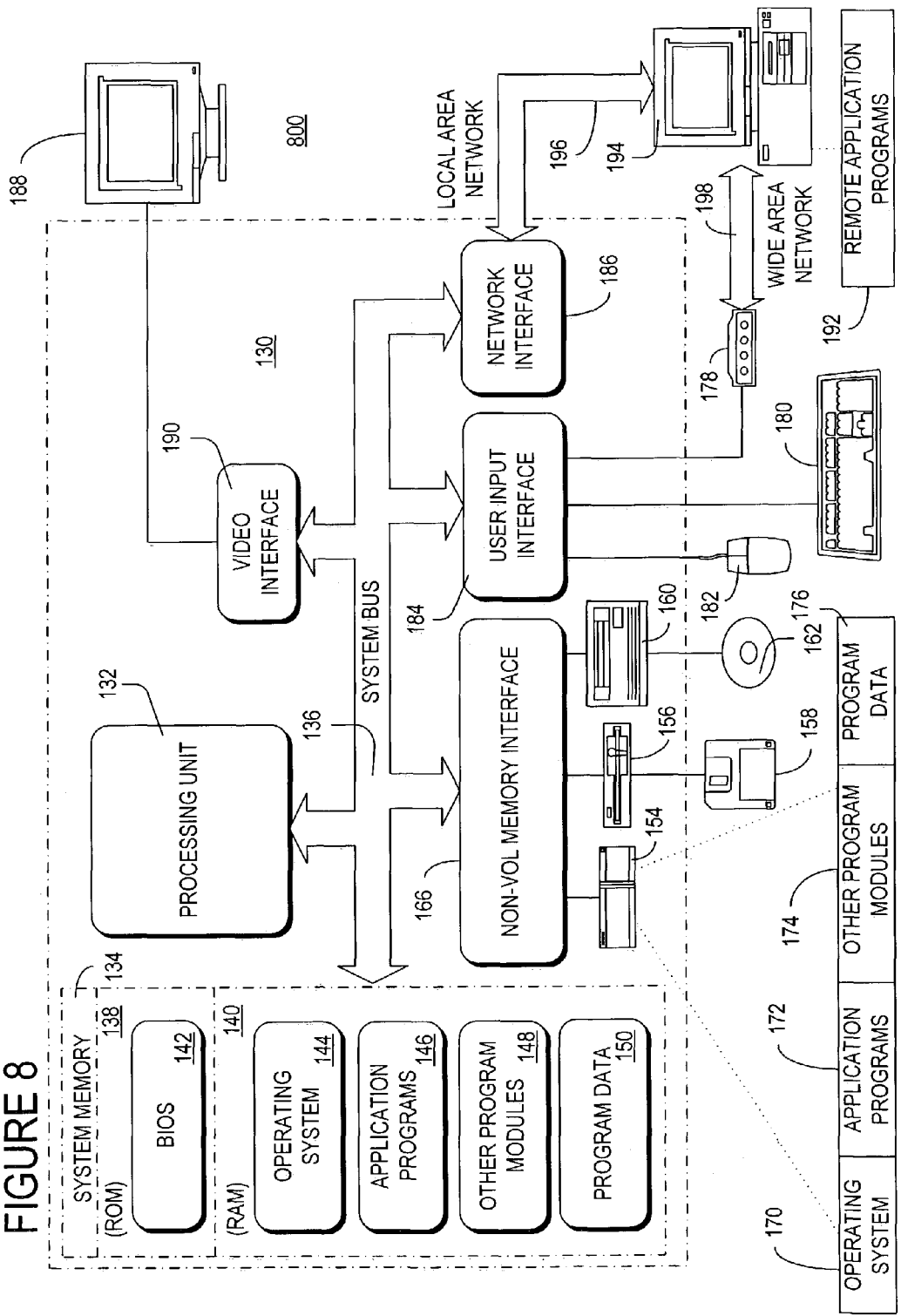

SOFTWARE IMAGE CREATION IN A DISTRIBUTED BUILD ENVIRONMENT

TECHNICAL FIELD

Embodiments of the present invention relate to the field of software image creation. In particular, embodiments of this invention relate to a distributed build environment in which a first computer delegates creation of a software image to a second computer.

BACKGROUND OF THE INVENTION

In a typical operating system build environment, code is compiled into binary form by a computer. Such an environment has no ability to use external resources for producing operating system runtime images. The build environment can support image creation internal to the computer, but then only can use a limited supply of valuable resources to satisfy the needs of creation of the final operating system image. For example, some existing environments dedicate and configure one computer for building a specific image (i.e., an operating system or application program). However, such systems are inefficient in that the dedicated computer is used solely for building the specific image (e.g., possibly once or twice a day). As such, each dedicated computer idles most of the time. Further, the amount of processing hardware needed grows as the number of different images to be created increases. For example, if images need to be built for six versions or configurations of seven different products, then forty-two dedicated computers are needed to build all the images. The cost of the initial hardware, maintenance, and support for the dedicated machines is substantial. There is a need for a system that can use external resources to create a software image. Further, there is a need for a system for building images that uses a small number of build computers efficiently. In addition, users experience delay and inconvenience as installation and configuration of the operating system are typically performed on an end user's computer. There is a need for a system in which installation and configuration occur during image creation.

Some existing systems allocate tasks to client computers for completion. For example, some existing systems implement distributed compiling in which client computers compile a portion of an application program and a central server links the compiled portions together as the application program. In another example, the SETI@home project distributes tasks to client computers for the analysis of data in search of extraterrestrial life. However, in such systems, the client computers do not create a final product. Further, such systems are not related to the creation of an installed software image.

Accordingly, a system for a distributed build environment for software images is desired to address one or more of these and other disadvantages.

SUMMARY OF THE INVENTION

Embodiments of the invention relate to a distributed build environment. In an embodiment, the invention includes delegating installation and configuration of a software image from a first computer to a second computer. In one form, a plurality of server computers defines jobs related to software image installation and configuration. A plurality of clients communicates with the servers to identify, accept and complete the jobs. For example, each client computer in the distributed build environment of the invention may be utilized continually to generate different software images. In this manner, the number of client computers needed to create images is reduced.

The invention provides a common method of installation and configuration through imaging. Further, operating system install times are reduced while installation and imaging are customizable by the client performing the build. Original equipment manufacturers (OEMs) and system builders may employ the distributed imaging process of the invention to easily modify, create, and image clients in the factory to dramatically reduce resource consumption and time.

In accordance with one aspect of the invention, a system for a distributed build includes a first computer and a second computer. The first computer maintains a list of jobs. Each of the jobs has an operation associated with creation of an installed software image. The second computer accepts one of the jobs from the first computer and executes the accepted job by performing the operation associated therewith.

In accordance with another aspect of the invention, a method operates in a distributed build environment in which one or more first computers delegate creation of an installed software image to a second computer. The method performed by the second computer includes accepting a job from one of the first computers. The job has an operation associated with the creation of an installed a software image. The method also includes completing the accepted job by performing the operation. The completed job represents the installed software image.

In accordance with yet another aspect of the invention, a method operates in a distributed build environment in which a first computer delegates creation of an installed software image to one or more second computers. The method performed by the first computer includes maintaining a list of jobs. Each of the jobs is related to creation of an installed software image. Each of the second computers selects one or more of the jobs and performs the selected jobs.

In accordance with still another aspect of the invention, a data structure exists in a distributed build environment in which a first computer delegates creation of an installed software image to a second computer. The data structure represents a status associated with installation of a software image. The data structure includes an identifier associated with the second computer. The data structure also includes a descriptor that indicates the status of the installation performed by the second computer as identified by the identifier.

In accordance with another aspect of the invention, a data structure exists in a distributed build environment in which a first computer delegates creation of an installed software image to a second computer. The data structure is stored on the first computer. The data structure represents one or more jobs. The data structure includes a job identifier associated with each of the jobs. The data structure also includes a script defining a plurality of operations associated with the job identifier to be performed by the second computer to install a software image.

In accordance with yet another aspect of the invention, a system provides a distributed build in which a first computer delegates creation of an installed software image to a second computer. The system includes a list means for the first computer, an interface means for the second computer, and an install means for the second computer. The list means maintains a list of jobs. Each of the jobs is related to creation of an installed software image. The interface means accepts one of the jobs maintained by the first computer via the list means. The job has an operation associated with installation of a software image. The install means completes the job accepted via the interface means by performing the operation. The completed job represents the installed software image.

Alternatively, the invention may comprise various other methods and apparatuses.

Other features will be in part apparent and in part pointed out hereinafter.

BRIEF DESCRIPTION OF THE DRAWINGS

FIG. 8 is a block diagram illustrating one example of a suitable computing system environment in which the invention may be implemented.

Corresponding reference characters indicate corresponding parts throughout the drawings.

DETAILED DESCRIPTION OF THE INVENTION

In one embodiment, the invention includes a distributed build environment in which one or more first computers delegate creation (e.g., installation and configuration) of a software image to one or more second computers. In particular, at least one server produces a list of imaging work items (e.g., jobs) to be completed by at least one distributed client. The list is generated based on the server configuration and the environment in which the build is being produced. After the work item list is created, any available imaging client has the ability to select and complete one of the work items from any one of the servers. Each work item is selected and completed by only one of the clients. The client installs, configures, and images the operating system and then uploads the final image back to the server. The server provides instructions (e.g., via a scripting mechanism) to the client for completing the job. After the client completes the job, the client updates the server with a completion status. The client then searches for another job to accept and complete.

The distributed build environment of the invention includes minimal configuration on the client making reallocation and redistribution of clients simple. The distributed environment allocates additional client resources to any of the servers. Additionally, the process is scalable. Because one imaging client may create multiple, different product images, build times may be reduced significantly by adding additional imaging clients. Having multiple imaging clients installing and configuring multiple software images dramatically increases client resource usage and efficiency. For example, with prior systems, if images need to be built for six versions or configurations of seven different products, then forty-two dedicated computers are needed to build all the images. However, with the invention, a single computer may successively build each of the images thereby reducing the amount and cost of processing hardware.

Figure 1:
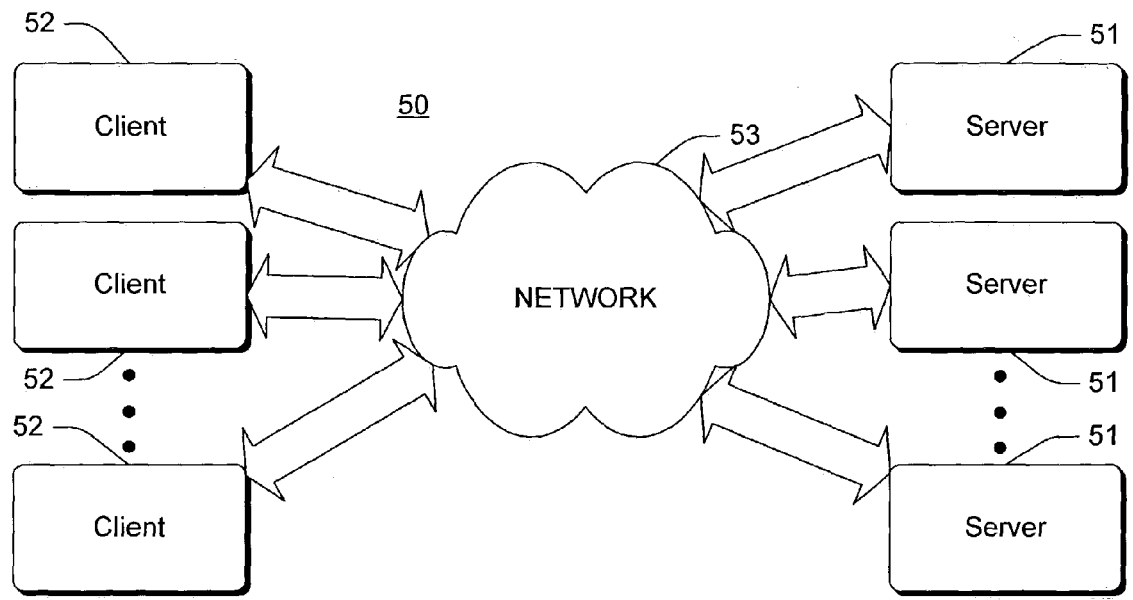
FIG. 1 is an exemplary embodiment of a client/server network system.

Referring first to FIG. 1, a block diagram illustrates an exemplary embodiment of a client/server network system for use in the distributed build environment of the invention. FIG. 1 shows the network system 50 comprising a plurality of servers 51 and clients 52. These computers 51, 52 are connected for high-speed data communications over a network 53 using well-known networking technology. The Internet is one example of network 53. Servers 51 accept requests from large numbers of remote network clients 52. The servers 51 provide responses comprising data to the clients 52 via network 53 although other means of communication may also be utilized. While the invention is described with reference to servers 51 and clients 52, it is contemplated by the inventors that the invention is operable in other network systems. That is, the invention is not limited to a client/server network system 50 as illustrated in FIG. 1. For example, the invention may be applicable in a peer-to-peer network system.

Figure 2:
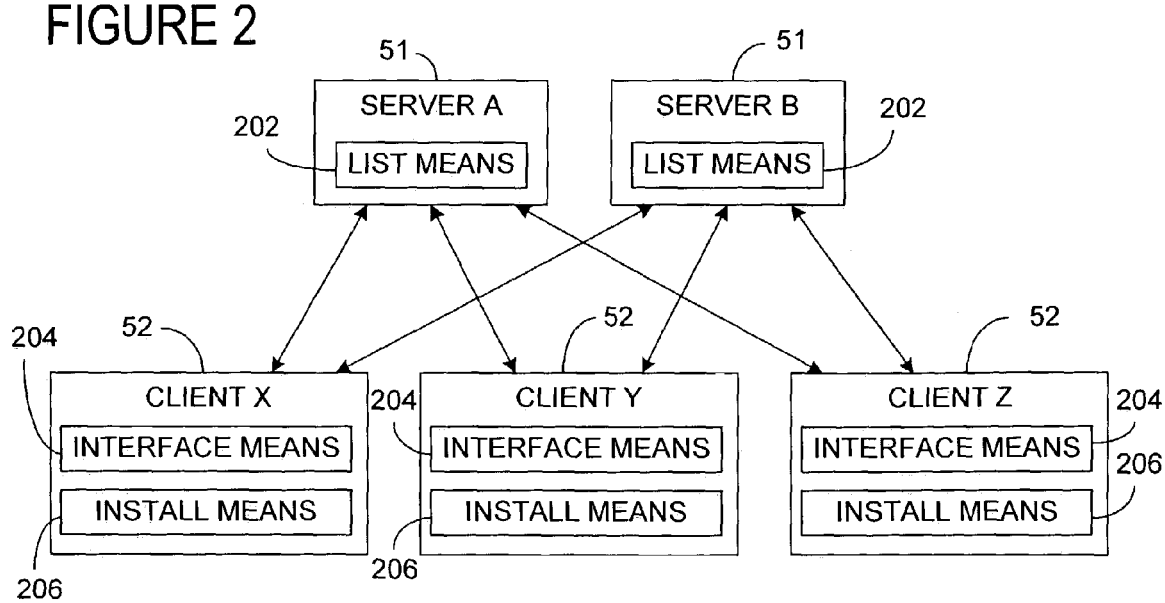
FIG. 2 is an exemplary block diagram illustrating communication between the clients and servers according to the invention.

Referring next to FIG. 2, an exemplary block diagram illustrates communication between the clients 52 and servers 51 according to the invention. In FIG. 2, server computers 51 such as server A and server B each communicate with a plurality of client computers 52 such as client X, client Y, and client Z to delegate creation of an installed software image in the distributed build environment. Each of the server computers 51 acts as a first computer operating to maintain a list of jobs. Each of the jobs relates to at least one operation associated with creation of an installed software image. For example, there may be one job per software product and multiple jobs per server 51. Each of the client computers 52 acts as a second computer operating to accept one of the jobs from the first computer and to complete the accepted job by performing the operation associated therewith. In particular, the operation includes installing, configuring, and imaging software. The second computer (e.g., the client computer 52) delivers the installed and configured software image to the first computer (e.g., the server computer).

In one form, the server computers 51 and server software constitute a list means 202 for maintaining the list of jobs. The client computers 52 and client software constitute an interface means 204 for accepting one of the jobs from the server computers 51. The client computers 52 and client software also constitute an install means 206 for completing the accepted job by performing one or more operations associated with the job. The completed job represents the installed software image. Structures corresponding to the list means, interface means, and install means further include the elements illustrated in the figures and described herein. Further, structure corresponding to a means to configure the installed software image (not shown) includes the client computers 52, client software, and the elements illustrated in the figures and described herein.

Figure 3:
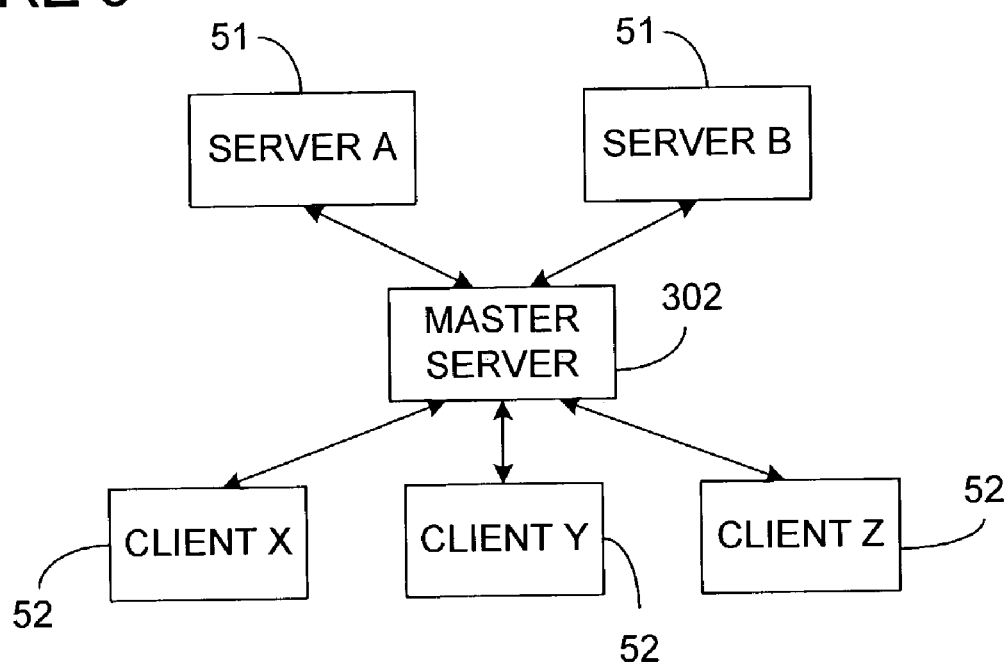
FIG. 3 is an exemplary block diagram illustrating the use of a master server to maintain jobs from all the servers for all the clients.

Referring next to FIG. 3, an exemplary block diagram illustrates the use of a master server 302 to maintain jobs from all the servers 51 for all the clients 52. In the exemplary embodiment of FIG. 3, each client computer 52 polls or otherwise locates the master server 302. The master server 302 maintains the list of available server computers 51 and communicates the list to each of the client computers 52 regularly (e.g., on request or broadcasted). The client computers 52 access the list to find a server 51 (e.g., server A) that has a job to be delegated and completed. The job may then be delegated to the client 52 through the master server 302 or via a peer-to-peer connection between the server 51 and the client 52. In another embodiment, the client computers 52 communicate with at least one of a plurality of master servers 302.

Figure 4:
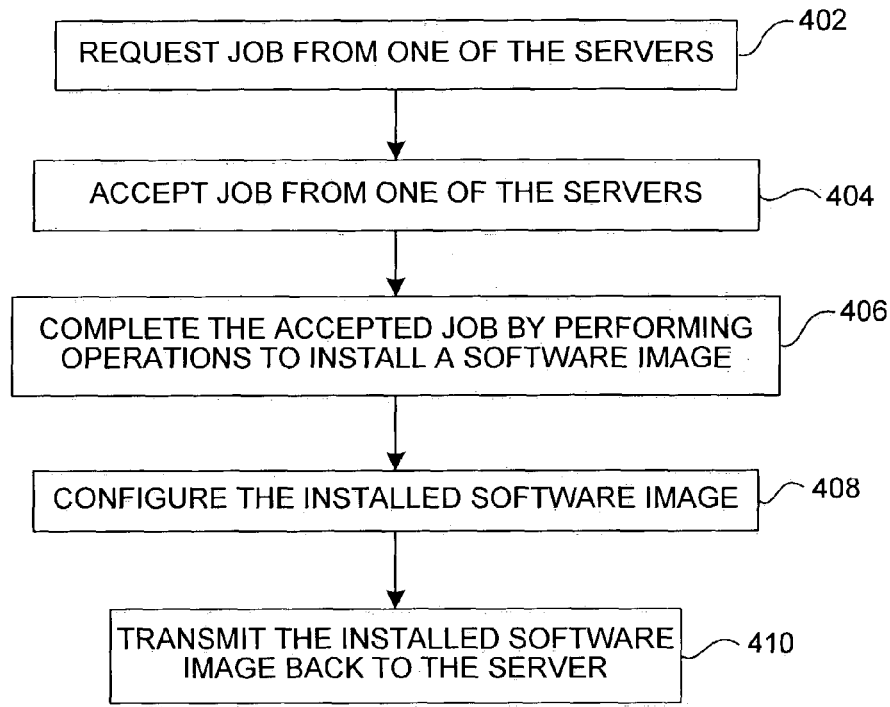
FIG. 4 is an exemplary flow chart illustrating operation of client software according to the invention.

Referring next to FIG. 4, an exemplary flow chart illustrates operation of client software according to the invention. The client software includes computer-executable instructions for requesting a job at 402 from one of the servers 51, accepting the job at 404, and completing the accepted job by performing the operation at 406. Accepting the job includes communicating with each of the servers 51 in succession to identify one or more jobs associated with the server 51. Each of the servers 51 stores a list of the available jobs in a specific file associated with the server 51 (e.g., relbuild.xml in FIG. 7). The client computers 52 access the specific file on the servers 51 to identify the available jobs. In one form, each server 51 also stores a job status file (e.g., job_id.xml in FIG. 7) associated with each of the jobs and stored on a medium accessible by the server 51. The client computers 52 determine an availability status for each of the jobs by searching for the job status file associated with the job. For example, the absence of the job status file indicates availability of the job.

Each of the jobs has a priority corresponding thereto. The list of jobs is organized according to the priority for each job. As such, the client computer 52 selects the highest priority job (e.g., by selecting the first of the identified jobs). Alternatively or in addition, the client computer 52 may accept a job assigned by one of the servers 51. After accepting the job, the client computer 52 creates a file (e.g., job_id.xml in FIG. 7) associated with the job to indicate that the client computer 52 is currently performing operations associated with the job. The file is stored on a computer-readable medium associated with the client computer 52 and/or the server computer. To store the file on a medium associated with the server computer as in FIG. 7, the client computer 52 provides credentials to the server 51 for authentication.

Those skilled in the art will note other means exist for indicating that a job has been accepted by one of the client computers 52. For example, the list of jobs on each of the servers 51 may include a field indicating whether the job has been accepted by one of the client computers 52. Upon acceptance of one of the jobs, the client 52 or server 51 updates the field to indicate that the client 52 has accepted the job. It is contemplated by the inventors that all such means are within the scope of the invention.

The client computer 52 may also download instructions such as a task list or a script for completing the job. In another embodiment, the instructions include software components such as libraries or other object files for use in completing the job. The client software includes instructions for configuring the installed software image at 408 and transmitting the installed software image at 410 back to the server 51 from which the job was accepted. The installed software image represents an operating system and/or an application program that is ready for deployment.

One or more computer-readable media accessible by the client computers 52 have computer-executable instructions for performing the method illustrated in FIG. 4. In one embodiment, the client computers 52 execute the instructions in the context of a running, minimal operating system environment.

In a specific example, the client software executes to poll the server(s) continuously for posted jobs. For each of the jobs posted by a particular server 51, the client software determines a current state of the job. In one embodiment, the client software searches for the absence or presence of a job status file (see FIG. 7) associated with the job. If the job status file for each job indicates that there are no jobs available from the particular server 51, the client software polls additional servers 51 in succession for posted jobs.

If one or more jobs are available from a particular server 51, the client software executes to accept one of the jobs. For example, the client software may accept the first available job (if ordered by priority) or accept a job assigned by the server 51 posting the job. After accepting one of the jobs associated with one of the server computers 51, the client software uses credentials to create a file (e.g., job_id.xml in FIG. 7) on the server computer to indicate that the job has been accepted. Further, the client software may create a corresponding status file locally. The client software performs operations associated with the accepted job to complete the job. For example, the operations may be embodied in a script to create, install, customize, configure, and/or modify a software image (e.g., an image of an operating system or application program). After completing the job, the client 52 stores an installed and configured software image that then can be sent elsewhere (e.g., to the server computer that posted the job).

An example script for the client 52 includes operations such as one or more of the following: configure or format a hard drive, download certain files for setup, start or launch setup, complete setup, activate the client 52, boot into a minimal operating system environment, image an operating system, and upload the completed image to the server 51.

Figure 5:
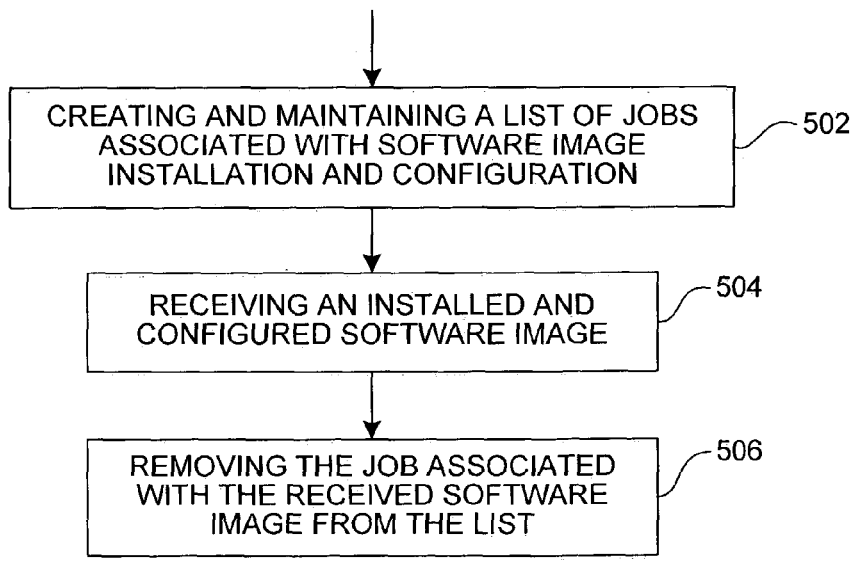
FIG. 5 is an exemplary flow chart illustrating operation of server software according to the invention.

Referring next to FIG. 5, an exemplary flow chart illustrates operation of server software according to the invention. The server software includes computer-executable instructions for dynamically creating and maintaining a list of jobs at 502. Each of the jobs is related to creation of an installed software image (e.g., installing and configuring a software image). The server computer posts the maintained list as a network resource (e.g., on a storage medium) accessible by the client computers 52. Each of the client computers 52 selects one or more of the jobs and performs the selected jobs. The list includes jobs available for selection by the-client computers 52, selected jobs, and performed (e.g., completed) jobs.

Maintaining includes adding jobs to the list and organizing the jobs in the list according to user input. The list of jobs is stored in a file (e.g., relbuild.xml in FIG. 7) accessible by the server 51 and client computers 52. Maintaining includes receiving from one of the client computers 52 the created and configured software installation at 504 corresponding to one of the jobs selected and performed by the client computer 52. In response to receiving the completed job, the server computer removes the job from the list at 506. The software installation may include an operating system and/or an application program. One or more computer-readable media have computer-executable instructions for performing the method illustrated in FIG. 5.

If a job fails to be accepted by one of the client computers 52 within a certain time period, the server 51 notifies the originator of the job. For example, the time period may be preset or configurable by the originator. The originator may select the time period based on the particular job. In one embodiment, the server 51 removes the unaccepted job from the list after the time period has elapsed. The originator or server 51 may also specify a time period for completing the accepted job. In one embodiment, if the client 52 fails to complete an accepted job within the time period (e.g., the client 52 experiences a failure and/hangs), the server 51 reclaims the accepted job to make it available to other clients 52. After recovering from a failure of server 51, the server 51 re-posts the list of incomplete jobs to the clients 52, clients 52 reclaim their respective jobs, and imaging work continues as before the server 51 failure.

In a specific example, the server software executes to prioritize and store each job in a file such as relbuild.xml. The priorities may be based on a deadline or any other factor and received via user input or stored in a configuration file. The server 51 further executes the server software to raise installation shares and make the relbuild.xml file available to the client computers 52. The server software waits for the jobs to be completed. In one form, after receiving completed images from clients 52, the server software creates network shares with the completed software images.

Figure 6:
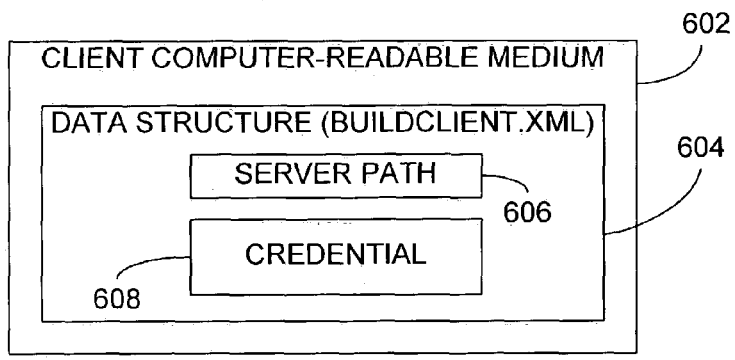
FIG. 6 is a block diagram illustrating an exemplary computer-readable medium accessible by a client computer.

Referring next to FIG. 6, a block diagram illustrates an exemplary computer-readable medium 602 associated with the client computer 52. The medium 602 stores a data structure 604 in the distributed build environment. The data structure 604 includes a server path 606 and a credential 608. The server path 606 defines a path to the server 51 (e.g., a network address such as //server/install). The credential 608 is associated with an identifier associated with the client 52 and the server path 606 for authentication during communication between the server 51 and the client 52. The client 52 communicates with the server 51 via the identifier, credential 608, and server path 606 to indicate to the server 51 that the client 52 is performing operations associated with the installation of the software image.

Figure 7:
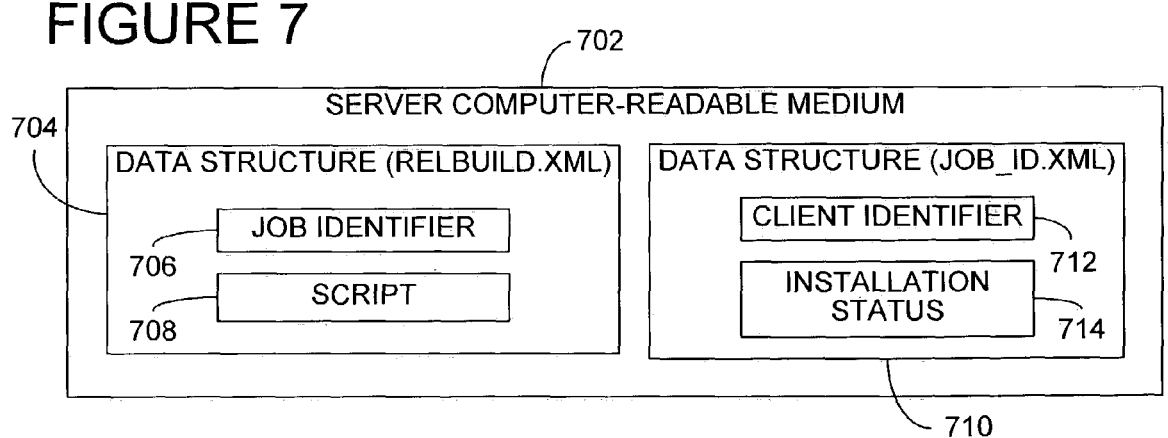
FIG. 7 is a block diagram illustrating an exemplary computer-readable medium accessible by a server computer.

Referring next to FIG. 7, a block diagram illustrates an exemplary computer-readable medium 702 associated with the server computer 51. The medium 702 stores a data structure 704 in the distributed build environment. The data structure 704 represents one or more jobs. The data structure 704 includes a job identifier 706 and a script 708. The job identifier 706 is associated with a particular job. The script 708 defines a plurality of operations associated with the job identifier 706 to be performed by the client 52 to install the software image. As described above, each of the jobs has a corresponding priority and each of the jobs is organized in the data structure 704 according to the corresponding priority. The script 708 further defines operations to configure the installed software image.

The computer-readable medium 702 in FIG. 7 stores another data structure 710. The data structure 710 represents a status associated with installation of a software image. The client 52 and server computers 51 access the data structure 710 to determine the status of the installation. The data structure 710 includes a client identifier 712 and an installation status 714 or other descriptor. The client identifier 712 identifies the client computer 52. The installation status 714 indicates the status of the installation performed by the client computer 52 identified by the client identifier 712. For example, the installation status 714 may indicate that the installation has completed or is in progress. If the installation is still in progress, the installation status 714 may also indicate a percentage of completion and/or estimated time remaining to completion. The client computer 52 updates the data structure 710 with the status as the client computer 52 completes the job. While shown in FIG. 7 as being stored on the server computer-readable medium 702, the job status data structure 710 is contemplated by the inventors to be stored alternatively or in addition on the client computer-readable medium 602 of FIG. 6.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infra-red, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, the client computer 52 such as computer 130 executes computer-executable instructions such as those illustrated in FIG. 4 to install and configure as software image. In addition, the server computer 51 such as computer 130 executes computer-executable instructions such as those illustrated in FIG. 5 to create and maintain a list of software imaging jobs.

For example, the server computer 51 such as computer 130 may execute two scripts during a postbuild process to prepare, instantiate, and complete the imaging process. The postbuild process occurs after compiling and linking, but before release of the build. One script (e.g., stagerel.cmd)

raises imaging shares on a network and monitors a staging directory for job completion. After imaging starts, the server computer 51 waits indefinitely for the clients 52 to upload completed images. The job status files in the staging directory store the current progress of the imaging process. The field MAJORSTATE in the job status files (see below) stores one of at least two states: INPROGRESS and FINISHED. After all jobs have been completed, the script will continue by lowering the shares and moving on to the next postbuild command. The script will not wait for images if shares could not be raised or if previous postbuild errors were detected.

Another script (e.g., img_createskus.cmd) executes twice during the postbuild process. When the script is launched the first time (i.e., prior to the other script stagerel.cmd), it creates a file named relbuild.xml containing server-specific information and client jobs required by the imaging machines (e.g., the client computers 52). The second instance of this script runs after stagerel.cmd and patches together the SKUs/products placing the resulting images in a specific directory. The stagerel.cmd script waits for client computers 52 to complete images and monitors the imaging directory which stores job status files. After all jobs have been taken and completed, the stagerel.cmd script continues. Image creation may be verified by viewing log files.

Clients 52 may be reclaimed while executing a job by deleting the local client job status file and rebooting the client 52. Further, imaging jobs accepted by the client 52 may be restarted by reclaiming the client 52 and deleting the server job status file.

The following examples of data structures stored on a computer-readable medium associated with one of the servers further illustrate the invention. An exemplary server configuration schema corresponding to relbuild.xml (see FIG. 6) is shown below. While only one job is shown in the schema for convenience, it is contemplated that the schema may define a plurality of jobs.

```
<SERVER>
    <BUILDTIME></BUILDTIME>
    <BUILDNUMBER></BUILDNUMBER>
    <LOGFILE></LOGFILE>
    <TITLE></TITLE>
    <JOBS>
        <JOB ID=" ">
            <TITLE></TITLE>
            <CONFIGTYPE></CONFIGTYPE>
            <INSTALLSCRIPT></INSTALLSCRIPT>
            <IMAGESCRIPT></IMAGESCRIPT>
            <TIMEOUT></TIMEOUT>
        </JOB>
    </JOBS>
</SERVER>
```

The following populated data structure represents a specific example of the server configuration schema.

```
<SERVER>
    <BUILDTIME>20021016:18:00:00</BUILDTIME>
    <BUILDNUMBER>3700</BUILDNUMBER>
    <LOGFILE>relbuild.log</LOGFILE>
    <TITLE>Main Build 3700</TITLE>
    <JOBS>
        <JOB ID="1">
            <TITLE>Professional Installation</TITLE>
            <CONFIGTYPE>PRO</CONFIGTYPE>
            <INSTALLSCRIPT>pro/install.cmd</INSTALLSCRIPT>
            <IMAGESCRIPT>pro/image.cmd</IMAGESCRIPT>
```

-continued

```
            <TIMEOUT>3600</TIMEOUT>
        </JOB>
    </JOBS>
</SERVER>
```

An exemplary job status schema corresponding to job_id.xml (see FIG. 7) is shown below.

```
<JOBSTATUS>
    <CLIENTID></CLIENTID>
    <TIMESTART></TIMESTART>
    <TIMECOMPLETE></TIMECOMPLETE>
    <CLIENTSTATUS>
        <MAJORSTATE></MAJORSTATE>
        <MINORSTATE></MINORSTATE>
    </CLIENTSTATUS>
</JOBSTATUS>
```

The following populated data structure represents a specific example of the job status schema.

```
<JOBSTATUS>
    <CLIENTID>RACK05_MACHINE10</CLIENTID>
    <TIMESTART>20021016:18:01:00</TIMESTART>
    <TIMECOMPLETE></TIMECOMPLETE>
    <CLIENTSTATUS>
        <MAJORSTATE>install</MAJORSTATE>
        <MINORSTATE>format</MINORSTATE>
    </CLIENTSTATUS>
</JOBSTATUS>
```

The following examples of data structures stored on a computer-readable medium associated with one of the client computers 52 illustrate the invention. An exemplary client configuration schema corresponding to buildclient.xml (see FIG. 6) is shown below.

```
<BUILDCLIENT ID=" ">
    <WAITTIME></WAITTIME>
    <CONFIGINCLUDE></CONFIGINCLUDE>
    <REDIRECTS>
        <REDIRECT>
            <USERNAME></USERNAME>
            <PASSWORD></PASSWORD>
            <CONFIGLOC></CONFIGLOC>
        </REDIRECT>
    </REDIRECTS>
</BUILDCLIENT>
```

The following populated data structure represents a specific example of the client configuration schema.

```
<BUILDCLIENT ID="RACK05_MACHINE10">
    <WAITTIME>60</WAITTIME>
    <CONFIGINCLUDE>PRO</CONFIGINCLUDE>
    <REDIRECTS>
        <REDIRECT>
            <USERNAME>redmond\bvt</USERNAME>
            <PASSWORD>bvtpassword</PASSWORD>
            <CONFIGLOC>\\ntre101\bvt$</CONFIGLOC>
        </REDIRECT>
    </REDIRECTS>
</BUILDCLIENT>
```

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A system for a distributed build comprising:
a first computer maintaining a list of jobs, each of said jobs having an operation associated with creation of an installed software image; and
a second computer polls the list of jobs maintained by the first computer, wherein the second computer accepts one of the jobs from the first computer and executes the accepted job by performing the operation associated therewith,
wherein the second computer in response to accepting one of the jobs creates the installed software image by configuring and imaging software and delivers the created image to the first computer.

2. The system of claim 1, further comprising a master computer through which the second computer accepts one of the jobs from the first computer.

3. A method in a distributed build environment in which a first computer delegates installation of a software image to one or more second computers, said method performed by the first computer comprising maintaining a list of jobs for installation of a software image, each of said jobs being related to creation of an installed software image, wherein each of the second computers polls the list of jobs, selects one or more of the jobs, performs the selected jobs, and creates the installed software image after performing the selected jobs.

4. The method of claim 3, wherein the list comprises jobs selected by the second computers.

5. The method of claim 3, wherein maintaining comprises organizing the jobs in the list according to user input.

6. The method of claim 3, further comprising dynamically creating the list.

7. The method of claim 3, wherein maintaining comprises creating a file defining the list of jobs.

8. The method of claim 3, wherein the list comprises one or more of the following: jobs available for selection, selected jobs, and performed jobs.

9. The method of claim 3, further comprising posting the maintained list as a network resource accessible by the second computers.

10. The method of claim 9, wherein the network resource comprises a storage medium.

11. The method of claim 3, wherein maintaining comprises adding jobs to the list.

12. The method of claim 3, wherein maintaining comprises:
receiving from one of the second computers the created software installation corresponding to one of the jobs selected and performed by the second computer; and
removing the job from the list.

13. The method of claim 12, wherein the received software installation has been configured by the second computer.

14. The method of claim 3, wherein the software installation comprises at least one of an operating system and an application program.

15. The method of claim 3, wherein each of the jobs is completed by only one of the second computers.

16. The method of claim 3, wherein maintaining comprises identifying one or more of the jobs selected by the second computers that fail to be completed within a specific time period.

17. The method of claim 16, wherein maintaining further comprises removing the identified jobs from the list.

18. The method of claim 3, further comprising specifying a time period for the second computers to complete each of the jobs in the list.

19. The method of claim 18, further comprising reclaiming from the second computers one or more of the jobs selected by the second computers if the one or more jobs have not been completed by the second computers within the specific time period.

20. The method of claim 3, wherein one or more computer storage media have computer-executable instructions for performing the method of claim 3.

21. A system for a distributed build in which a first computer delegates creation of an installed software image to a second computer, said system comprising:
a list means for the first computer to maintain a list of jobs, each of said jobs being related to creation of an installed software image;
an interface means for the second computer to poll one of the jobs maintained by the first computer via the list means, wherein the second computer accepts one of the jobs, said job having an operation associated with the creation of an installed software image;
an install means for the second computer to complete the job accepted via the interface means by performing the operation, wherein the completed job represents the installed software image, and wherein the install means creates the installed software image after the install means completes the job; and
means for the second computer to configure the installed software image.

* * * * *